United States Patent
Ohhashi

(10) Patent No.: US 8,131,136 B2
(45) Date of Patent: Mar. 6, 2012

(54) PANEL TELEVISION DEVICE WITH BUILT-IN DISC LOADER

(75) Inventor: Naruyuki Ohhashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1618 days.

(21) Appl. No.: 11/497,678

(22) Filed: Aug. 1, 2006

(65) Prior Publication Data

US 2007/0031127 A1    Feb. 8, 2007

(30) Foreign Application Priority Data

Aug. 2, 2005  (JP) .................................. 2005-224382

(51) Int. Cl.
 *H04N 5/77*     (2006.01)
 *H04N 9/80*     (2006.01)
(52) U.S. Cl. ........................................ 386/359; 386/261
(58) Field of Classification Search .................... 386/46, 386/95, 118, 126, 358–362
 See application file for complete search history.

(56) References Cited

U.S. PATENT DOCUMENTS

| | | | |
|---|---|---|---|
| 6,445,654 B1* | 9/2002 | Hayakawa et al. | 369/47.23 |
| 7,900,221 B2* | 3/2011 | Kaminosono | 720/626 |
| 8,000,586 B2* | 8/2011 | Feng | 386/361 |
| 2004/0005138 A1* | 1/2004 | Yano et al. | 386/46 |
| 2005/0018081 A1* | 1/2005 | Tomikawa | 348/552 |
| 2006/0280487 A1* | 12/2006 | Asami | 386/126 |

FOREIGN PATENT DOCUMENTS

| | | |
|---|---|---|
| JP | 11-149689 | 6/1999 |
| JP | 2001-126357 | 5/2001 |
| JP | 2003-217208 | 7/2003 |

OTHER PUBLICATIONS

Patent Abstracts of Japan, Publication No. 2001-126357, Publication Date: May 11, 2001, 1 page.
Patent Abstracts of Japan, Publication No. 2003-217208, Publication Date: Jul. 31, 2003, 1 page.
Patent Abstracts of Japan, Publication No. 11-149689, Publication Date: Jun. 2, 1999, 1 page.

* cited by examiner

*Primary Examiner* — Thai Tran
*Assistant Examiner* — Hung Dang
(74) *Attorney, Agent, or Firm* — Osha Liang LLP

(57) ABSTRACT

The present invention aims to provide a panel television device with built-in disc loader capable of constantly detecting a mounted state of a disc while alleviating the process of the television section. The panel television device with built-in disc loader has a disc loader section arranged with a disc sensor which state changes according to the detection of the presence of the disc inside, and a sub-microcomputer for performing a disc detecting process based on the state of the disc sensor; and has a television section arranged with a main microcomputer for performing the disc detecting process based on the state of the disc sensor; where drive power is constantly supplied to the disc sensor and the main microcomputer; and the disc detecting process is performed by the sub-microcomputer when the power of the disc loader section is turned ON, and the disc detecting process is performed by the main microcomputer when the power of the disc loader section is turned OFF.

2 Claims, 7 Drawing Sheets

PANEL TELEVISION DEVICE WITH BUILT-IN DISC LOADER

BACKGROUND OF THE INVENTION

1. Field of the Invention

The present invention relates to a panel television device with built-in disc loader incorporating a disc loader section for processing a disc inserted from an opening on the side surface.

2. Description of the Related Art

With the widespread use of discs such as a DVD (Digital Versatile Disc) as a medium for recording picture or voice data in recent years, various devices such as a single device such as a DVD player for performing processes of reproduction and the like of data with respect to the disc, or a compound device such as a television incorporating a module for performing the same process are being proposed. In the compound device, the module, that is, the section that is actually mounted with the disc and that reads and performs the reproduction of data from the disc and the like is referred to as a disc loader section.

A method of mounting the disc inside the device includes a slot-in type in which the disc is inserted inside from an opening formed at the front side surface, side surface etc. of the device, a tray type in which the disc is placed on a tray and taken inside. The slot-in type is more effective in terms of thinning the device when incorporating the disc loader section in the panel television device and the like that employs displays such as LCD (Liquid Crystal Display) or PDP (Plasma Display Panel).

In the panel television device incorporating the disc loader section of slot-in type, for the purpose of saving power, the power of the disc loader section is generally turned OFF (state in which supply of drive power to each part of the disc loader section is interrupted) when disc processing such as conveyance of the disc, reproduction of the disc etc. is not being performed. Further, in the relevant device, for the sake of convenience such as alleviating the operation load of the user and the like, when the disc is inserted from the opening, it is necessary that the insertion is detected and the power of the disc loader section and the television section is immediately turned ON (state in which drive power to each part of the disc loader section and the television section is supplied), and the disc is automatically reproduced at the disc loader section and the picture and voice are output at the television section.

Conventionally, in the single device adopting the slot-in type, a controlling means such as a CPU detects the mounted state of the disc based on the state of the detecting means such as a sensor for detecting the presence of the disc in the device, controls the operation of each part according to the detection result, and performs processes such as conveyance of the disc, as disclosed in patent articles 1 and 2 mentioned below. When such disc detecting process is performed by the controlling means, each part can be automatically operated to perform the disc processing.

Patent article 3 mentioned below discloses an electrical circuit for detecting that an eject button has been pressed while the power of the disc loader section is turned OFF in a personal computer and the like of the tray type, and supplying the power to the disc loader section to operate a tray loading mechanism of the disc loader section. However, patent article 3 does not describe the processes of detection, reproduction and the like of the disc.

Patent article 1: Japanese Laid-Open Patent Publication No. 2001-126357

Patent article 2: Japanese Laid-Open Patent Publication No. 2003-217208

Patent article 3: Japanese Laid-Open Patent Publication No. 11-149689

The panel television device with built-in disc loader of slot-in type has an advantage in that when an existing controlling means developed for the single device such as in patent articles 1 and 2 is incorporated in the disc loader section, the disc detecting process can be performed by the controlling means and the disc process can be immediately executed automatically, and further, in that trouble and time are not required in designing and developing of the controlling means and the manufacturing cost can be reduced. However, as described above, since the power of the disc loader section is turned OFF other than at the time of disc processing for saving power, the controlling means of the disc loader section is not driven and the disc cannot be detected. Similarly performing the disc detecting process with the controlling means incorporated in the television section is alternatively considered, but since the controlling means of the television section has a great amount of processes to perform such as performing operation control of each part so as to output picture and voice based on a disc reproduction signal input from the disc loader section and a television signal externally input via a tuner and the like, the burden thereon increases.

SUMMARY OF THE INVENTION

The present invention aims to, in view of solving the above problems, to provide a panel television device with built-in disc loader capable of constantly detecting the mounting state of the disc while alleviating the process of the television section.

The present invention relates to a panel television device with built-in disc loader comprising a disc loader section for processing a disc inserted from an opening on a side surface, and a television section for outputting picture and voice based on a disc reproduction signal input from the disc loader section or an externally input television signal, the disc loader section including a detecting means which state changes according to the detection of the presence of the disc inside, and a controlling means for performing a disc detecting process for detecting a mounted state of the disc based on the state of the detecting means, the power of the disc loader section being turned OFF other than at time of disc processing; wherein the television section includes a controlling means for performing the disc detecting process based on the state of the detecting means; drive power is constantly supplied to the detecting means and the controlling means of the television section; and the disc detecting process is performed by the controlling means of the disc loader section when the power of the disc loader section is turned ON, and the disc detecting process is performed by the controlling means of the television section when the power of the disc loader section is turned OFF.

Since the disc detecting process is performed by the controlling means of the television section when the power of the disc loader section is turned OFF, the insertion of the disc into the disc loader section is detected by the relevant controlling means, and the disc process is automatically executed immediately afterwards. Further, since the drive power does not need to be supplied to the controlling means of the disc loader section, the power can be saved. Since the disc detecting process is performed in the controlling means of the disc loader section when the power of the disc loader section is turned ON, the state of the detecting means does not need to be monitored and the disc detecting process does not need to be performed by the controlling means of the television section, whereby the load of the controlling means is alleviated. Further, an existing controlling means developed for the single device may be used as the controlling means of the disc loader section, and thus trouble and time are not required in designing and developing the controlling means and the manufacturing cost can be reduced. Hence, mounted state of the disc can be constantly detected while alleviating the process of the television section in the panel television with built-in disc loader.

The embodiment of the present invention relates to a panel television device with built-in disc loader comprising a disc loader section for conveying and performing data processes with respect to a disc inserted from an opening on a side surface, and a television section for outputting picture and voice based on a disc reproduction signal input from the disc loader section or an externally input television signal, the disc loader section including a disc sensor which state changes according to the detection of the presence of the disc inside, and a sub-microcomputer for performing operation control of each part of the disc loader section and performing a disc detecting process for detecting a mounted state of the disc based on the state of the disc sensor, the power of the disc loader section being turned OFF other than at time of disc processing; wherein the television section includes a main microcomputer for performing operation control of each part of the television section, outputting operation instruction to the sub-microcomputer, and performing the disc detecting process based on the state of the disc sensor; drive power is constantly supplied to the disc sensor and the main microcomputer; and the disc detecting process is performed by the sub-microcomputer when the power of the disc loader section is turned ON, and the disc detecting process is performed by the main microcomputer when the power of the disc loader section is turned OFF.

Since the disc detecting process is performed by the main microcomputer of the television section when the power of the disc loader section is turned OFF, the insertion of the disc into the disc loader section is detected by the main microcomputer, and the disc processing of conveying and reproducing the data of the disc and the like is automatically executed immediately afterwards. Further, since the drive power does not need to be supplied to the sub-microcomputer of the disc loader section, the power can be saved. Since the disc detecting process is performed by the sub-microcomputer of the disc loader section when the power of the disc loader section is turned ON, the state of the disc sensor does not need to be monitored and the disc detecting process does not need to be performed by the main microcomputer of the television section, whereby the load of the main microcomputer is alleviated. Further, an existing controlling means developed for the single device may be used as the main microcomputer of the disc loader section, and thus trouble and time are not required in designing and developing the sub-microcomputer and the manufacturing cost can be reduced. Hence, the mounted state of the disc is thus constantly detectable while alleviating the process of the television section in the panel television with built-in disc loader.

According to the present invention, in the panel television device with built-in disc loader, the disc detecting process is performed in the television section when the power of the disc loader section is turned OFF, and the disc detecting process is performed in the disc loader section and does not need to be performed in the television section when the power of the disc loader section is turned ON, whereby the mounted state of the disc can be constantly detected while alleviating the process of the television process.

DETAILED DESCRIPTION OF THE PREFERRED EMBODIMENTS

Figure 1:
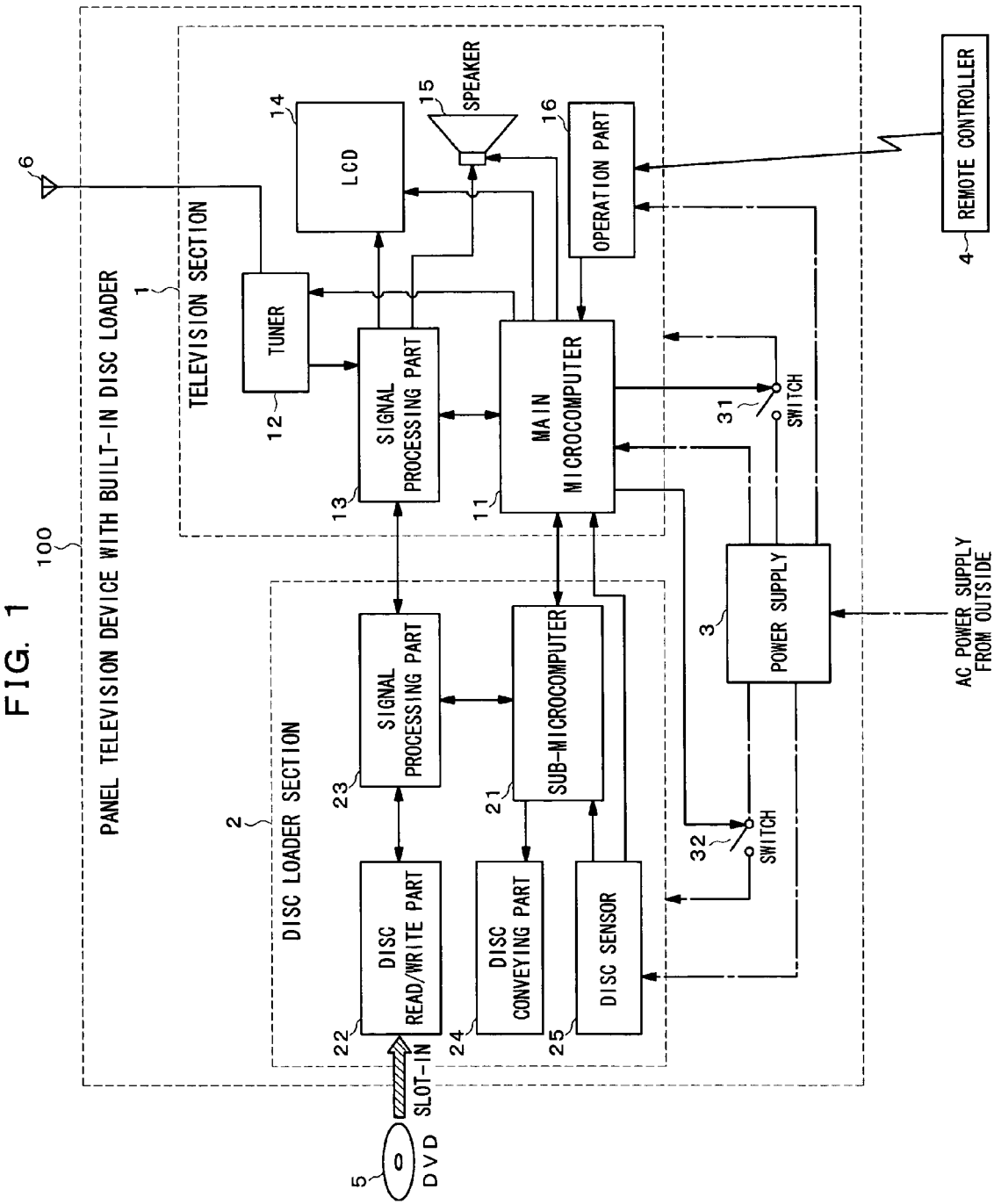
FIG. 1 is a block diagram of a panel television device with built-in disc loader.

FIG. 1 is a block diagram of a panel television device with built-in disc loader according to an embodiment of the present invention. The panel television device with built-in disc loader (hereinafter referred to simply as "panel television device") 100 is mainly configured by a television section 1 having a function serving as a television receiver, a disc loader section 2 with a disc loading function of slot-in type, a power supply 3 supplied with AC power from the outside via a power supply cord (not shown) and the like, and a remote controller 4 for remote operation.

A main microcomputer 11 serving as a controlling means of the television section is configured by a CPU, a memory such as ROM and RAM, and the like, and performs the operation control of each part of the television section 1, power supply 3 and the like, and outputs operation instruction to the disc loader section 2. A tuner 12 extracts a television signal of a predetermined channel from a television broadcast airwave received at an antenna 6. A signal processing part 13 generates a picture signal for displaying a picture on the LCD (Liquid Crystal Display) 14 and a voice signal for outputting voice from a speaker 15 based on the television signal input from the tuner 12 or a disc reproduction signal input from the disc loader 2 side, and outputs each signal to the LCD 14 and the speaker 15 respectively. The LCD 14 is configured by a liquid crystal cell, a back light, a drive IC and the like, and displays pictures based on the picture signal input from the signal processing part 13. The speaker 6 includes an amplifier circuit and the like, and outputs voice based on the voice signal input from the signal processing part 13. An operation part 16 is configured by various operation keys arranged on the front surface of a housing of the panel television device 100, an LED (Light Emitting Diode), a remote controller receiving part for receiving signal from the remote controller 4 and the like.

A sub-microcomputer 21 serving as a controlling means of the disc loader section 2 is configured by a CPU, a memory such as ROM and RAM, and the like, and performs operation control of each part of the disc loader section 2. An existing microcomputer developed for a stationary DVD (Digital Versatile Disc) player is used as the sub-microcomputer 21. A disc read/write part 22 is configured by an optical pick up, a motor, a servo circuit and the like, and reads data of picture and voice recorded on the DVD 5 or writes data of picture and voice on the DVD 5. The DVD 5 serves as a recording medium inserted inside from an opening (not shown) arranged on the side surface of the housing of the panel television device 100. A signal processing part 23 performs reproduction process on the data of MPEG (Moving Picture Experts Group) format of the DVD 5 read in the disc read/ write part 22, and inputs the result to the signal processing part 13 of the television section 1 as the disc reproduction signal. A signal processing part 23 also performs MPEG conversion of the picture signal and the voice signal input from the signal processing part 13 and inputs the data of MPEG format to the disc read/write part 22. A disc conveying part 24, configured by a roller, a gear, a motor and the like, conveys and mounts the DVD 5 inserted from the opening of the panel television device 100 to an inner position at where process can be performed by the disc read/write part 22, or conveys the inner DVD 5 to a position from where the disc can be taken out through the opening. A disc sensor 25 serving as a detecting means is configured by a photosensor, a microswitch or the like. The sensor detects the presence of the DVD 5 inside, whereby it is changed to the ON state or the OFF state. The main microcomputer 11 and the sub-microcomputer 21 perform the disc detecting process for detecting the mounted state of the DVD 5 based on the ON/OFF state of the disc sensor 25.

The power supply part 3 constantly supplies the drive power to the main microcomputer 11, the disc sensor 25 and the operation part 16, and supplies the drive power to each part of the television section 1 and the disc loader section 2 other than the above when the switches 31, 32 are connected. That is, the television section 1 and the disc loader section 2 are turned ON (activated) when the respective switches 31, 32 are connected, and are turned OFF (deactivated) when the switches 31, 32 are opened. The switch between connecting and opening of the switches 31, 32 is performed by the main microcomputer 11. The main microcomputer 11 opens the switch 32 when not performing the disc processing of conveying the DVD 5, reproducing the data and the like, so that the disc loader section 2 is in the OFF state.

Figure 2:
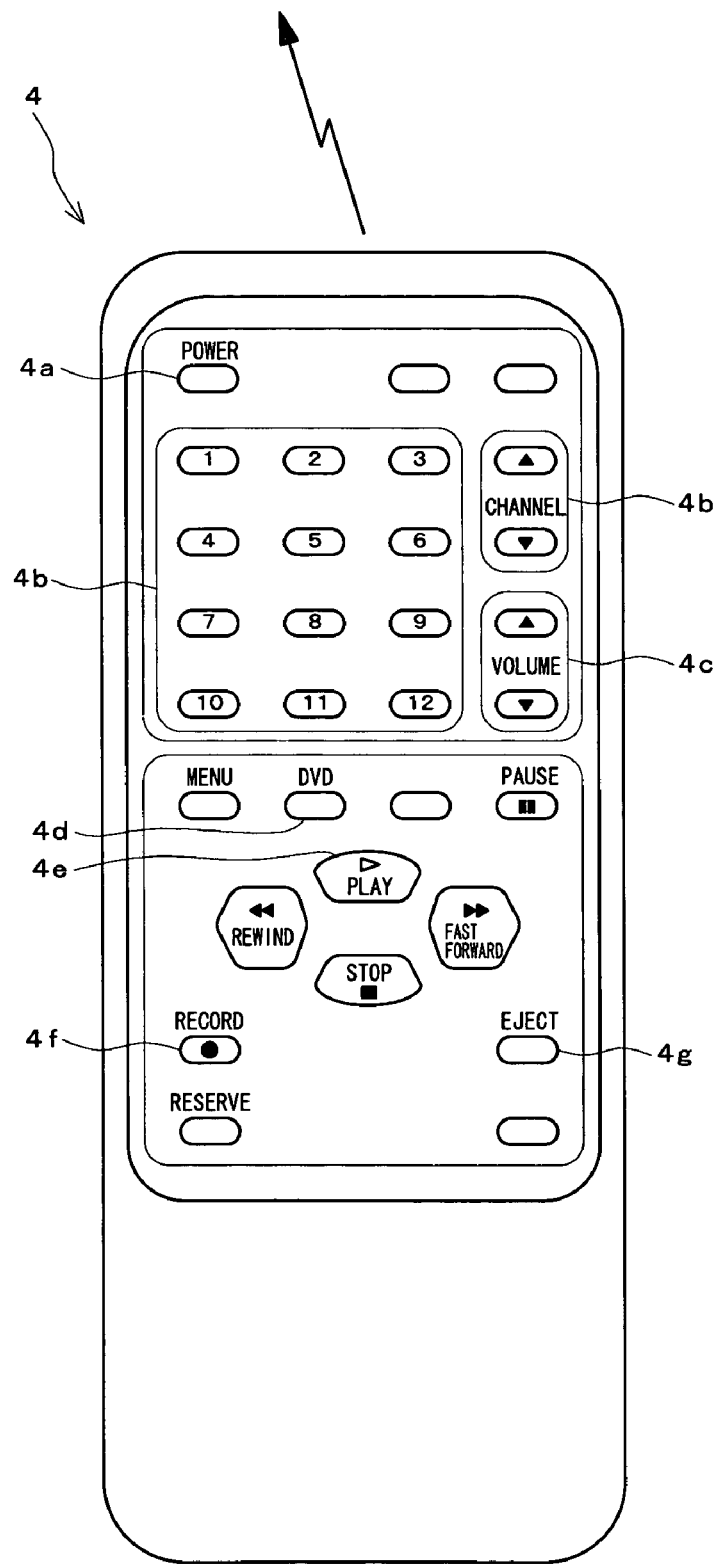
FIG. 2 is an outer appearance view of a remote controller of the device.

FIG. 2 is an outer appearance view of the remote controller 4. A plurality of operation keys that are pressed and operated are arranged on the surface of the remote controller 4, and a circuit and the like is arranged inside for transmitting an infrared signal indicating the key that has been pressed and operated and turned ON to the operation part 16 of the panel television device 100. The operation keys include a power key 4a, a channel key 4b, a volume key 4c, a DVD mode key 4d, a play key 4e, a record key 4f, an eject key 4g and the like. Similar operation keys are arranged on the operation part 16. The main microcomputer 11 of the television section 1 constantly monitors the operation state of each operation key of the operation part 16 and the remote controller 4.

Figure 3:
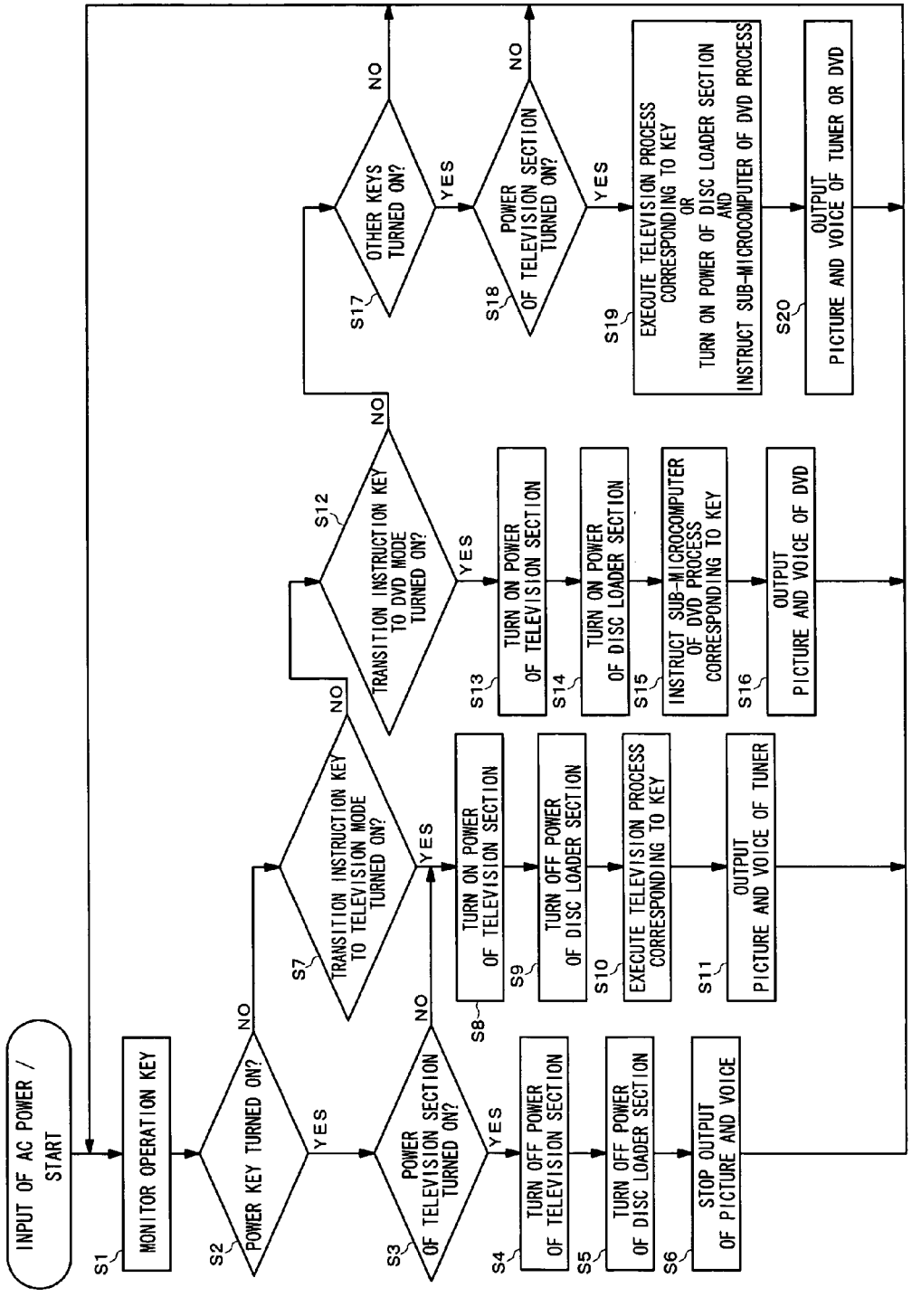
FIG. 3 is a flow chart of a main microcomputer of the device.

FIG. 3 is a flow chart showing the procedures of the processes performed by the main microcomputer 11 of the television section 1. In a state the AC power is externally supplied to the power supply part 3 of the panel television device 100, the main microcomputer 11 constantly performs state monitoring of each operation key of the operation part 16 and the remote controller 4 (step S1). When the power key 4a is operated and turned ON (step S2: YES) during monitoring, the main microcomputer 11 checks whether or not the power of the television section 1 is turned ON (step S3). If the power of the television section 1 is turned OFF (step S3: NO), the main microcomputer 11 connects the switch 31 to turn ON the power of the television section 1 (step S8), and opens the switch 32 to maintain the power of the disc loader section 2 in the OFF state (step S9) in order to activate only the television section 1. The main microcomputer 11 then controls each part of the television section 1, and executes the television processes according to the key (step S10). In this case, since the power key 4a is operated, the television signal of the channel selected at the previous activation is input from the tuner 12 to the signal processing part 13, which signal is then performed with signal processing in the signal processing part 13. The picture based on the signal is then displayed on the LCD 14, and the voice is output from the speaker 15 (step S11). If the power of the television section 1 is turned ON in step S3 (step S3: YES), the main microcomputer 11 opens the switch 31 to turn OFF the power of the television section 1 (step S4) and opens the switch 32 to turn OFF the power of the disc loader section 2 (step S5) in order to deactivate the television section 1 and the disc loader section 2, and stops the output of the picture and voice at the LCD 14 and the speaker 15 (step S6).

Under the condition that the power key 4a is in the OFF state (step S2: NO), even if the transition instruction key to the television mode such as the channel key 4b is operated and turned ON (step S7: YES), the main microcomputer 11 connects the switch 31 to turn ON the power of the television section 1 (step S8) and opens the switch 32 to maintain the OFF state of the power of the disc loader section 2 (step S9) in order to activate only the television section 1. The main microcomputer 11 then executes the television process corresponding to the key (step S10). For instance, if the channel key 4b is operated, the television signal of the channel selected by the relevant operation is input from the tuner 12 to the signal processing part 13, which signal is processed in the signal processing part 13. The picture based on the signal is then displayed on the LCD 14 and the voice is output from the speaker 15 (step S11).

Under the condition that the power key 4a and the transition instruction key to the television mode are in the OFF state (step S2: NO, step S7: NO), when the transition instruction key to the DVD mode such as the DVD mode key 4d, the play key 4e, or the eject key 4g and the like is operated and turned ON (step S12: YES), the main microcomputer 11 connects the switch 31 to turn ON the power of the television section 1 (step S13) and connects the switch 32 to turn ON the power of the disc loader section 2 (step S14) in order to activate both the television section 1 and the disc loader section 2. The main microcomputer 11 then instructs the sub-microcomputer 21 of the DVD process corresponding to the relevant key (step S15). The sub-microcomputer 21 then controls each part of the disc loader section 2 and executes the DVD process instructed by the main microcomputer 11. For instance, if the play key 4e is operated, the data of the DVD 5 mounted inside in the disc loader section 2 is read and reproduced, the picture based on the disc reproduction signal input from the disc loader section 2 in the television section 1 is displayed on the LCD 14, and the voice is output from the speaker 15 (step S16).

Under the condition that the power key 4a, the transition instruction key to the television mode, and the transition instruction key to the DVD mode are in the OFF state (step S2: NO, step S7: NO, step S12: NO), when other keys such as the volume key 4c, the record key 4f or the like is operated and turned ON (step S17: YES), the main microcomputer 11 checks whether or not the power of the television section 1 is turned ON (step S18). If the power of the television section 1 is turned ON (step S18: YES), the main microcomputer 11 executes the television process corresponding to the relevant key, or turns ON the power of the disc loader section 2 and instructs the sub-microcomputer 21 of the DVD process corresponding to the relevant key (step S19). For instance, if the volume key 4c is operated, the volume output from the speaker 15 is adjusted according to the operation (step S20) while maintaining the state of displaying the picture on the LCD 14 in the television section 1. If the record key 4f is operated, the picture and voice based on the television signal input from the tuner 12 in the television section 1 are output from the LCD 14 and the speaker 15 (step S20), respectively, and further, the data of the picture and voice for recording based on the television signal from the tuner 12 in the television section 1 are generated and output to the disc loader section 2 so that the data of the picture and voice are recorded on the DVD 5 in the disc loader section 2. If none of the operation keys are turned ON (step S17: NO), or the power of the television section 1 is in the OFF state (step S18: NO) even if the other keys are operated, the main microcomputer 11 does not perform any process and continues monitoring the state of each operation key (step S1).

Figure 4:
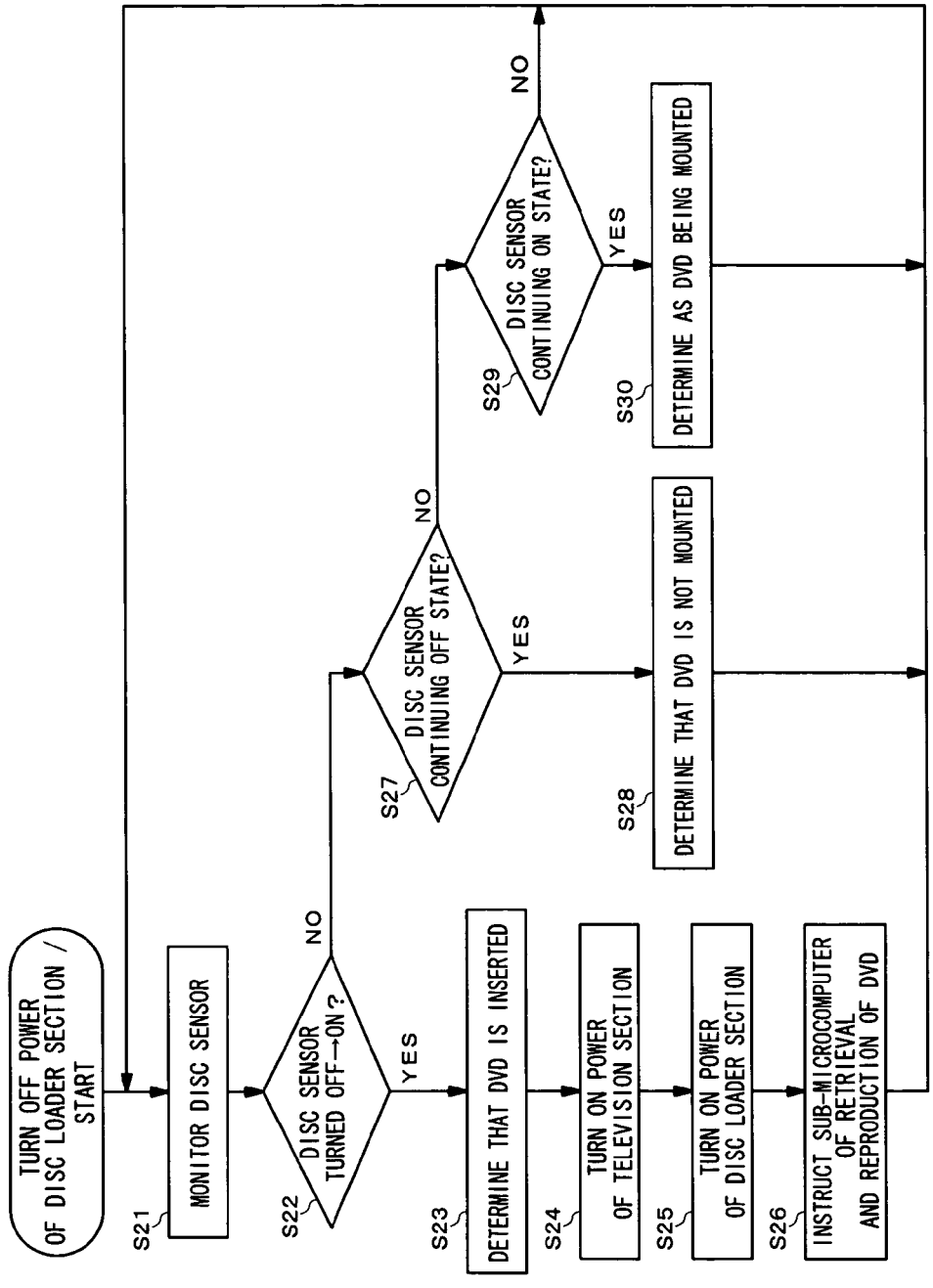
FIG. 4 is a flow chart of a main microcomputer of the device.

FIG. 4 is a flow chart showing the procedures of the disc detecting process performed by the main microcomputer 11 of the television section 1 independent from each process of FIG. 3. When the power of the disc loader section 2 is turned OFF, the main microcomputer 11 performs state monitoring of the disc sensor 25 (step S21). If the disc sensor 25 switches from the OFF state to the ON state (step S22: YES) during monitoring, the main microcomputer 11 determines that the DVD 5 has been inserted from the opening of the panel television device 100 (step S23). The main microcomputer 11 then connects the switch 31 to turn ON the power of the television section 1 (step S24) and connects the switch 32 to turn ON the power of the disc loader section 2 (step S25) in order to activate both the television section 1 and the disc loader section 2, and subsequently, instructs the sub-microcomputer 21 of retrieving the inserted DVD 5 and reproducing the data of the DVD 5 (step S26). Thereafter, in the disc loader section 2, the sub-microcomputer 21 conveys the DVD 5 inside with the disc conveying part 24 and reproduces the data of the DVD 5 with the disc read/write part 22 and the signal processing part 23. The picture based on the disc reproduction signal is then displayed on the LCD 14 and the voice is output from the speaker 15 in the television section 1.

When the disc sensor 25 continues the OFF state (step S27: YES), the main microcomputer 11 determines that the DVD 5 is not mounted (step S28) and continues state monitoring of the disc sensor 25 (step S21). In this case, even if the operation keys associated with the DVD process such as the play key 4e, the record key 4f and the like are operated, the DVD process corresponding to the key is not performed on the DVD 5. When the disc sensor 25 continues the ON state after being turned ON (step S29: YES), the main microcomputer 11 determines that the DVD 5 is being mounted (step S30) and continues the state monitoring of the disc sensor 25 (step S21). In this case, when the operation key associated with the DVD process is operated, the DVD process corresponding to the key is performed on the DVD 5. When the disc sensor 25 is not switched from the OFF state to the ON state (step S22: NO) and is not continuing the ON state or the OFF state (step S27: NO, step S29: NO), that is, when the disc sensor 25 is switched from the ON state to the OFF state, the main microcomputer 11 does not detect and continues the state monitoring of each operation key (step S1).

Figure 5:
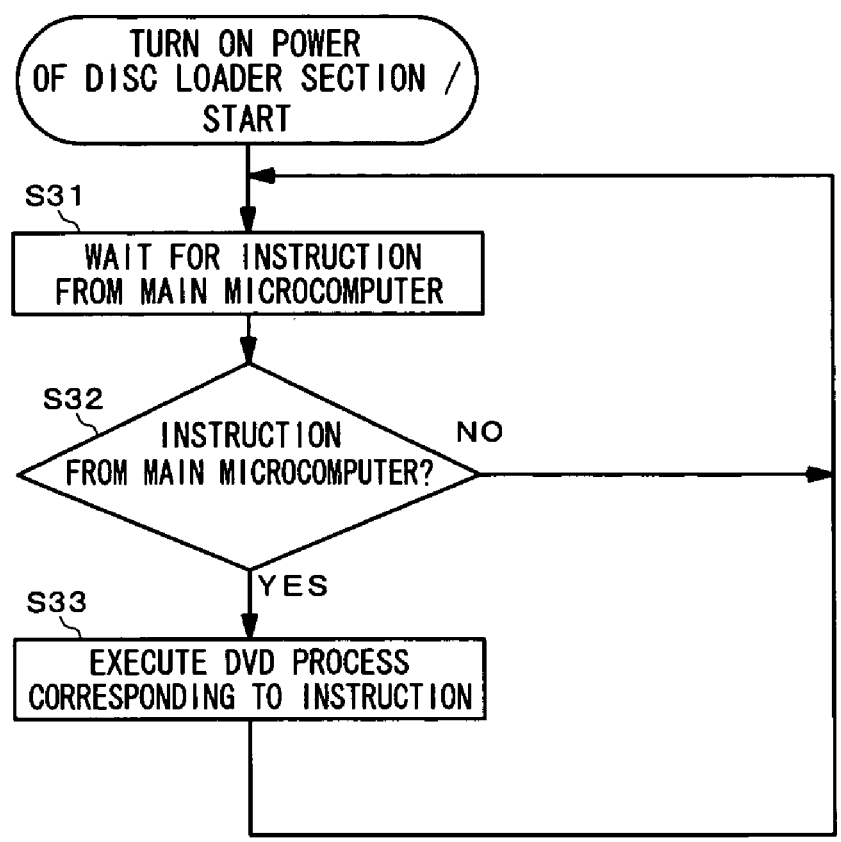
FIG. 5 is a flow chart of a sub-microcomputer of the device.

FIG. 5 is a flow chart showing the procedures of the process performed by the sib-microcomputer 21 of the disc loader section 2. When the power of the disc loader section 2 is turned ON, the sub-microcomputer 21 has each part of the disc loader section 2 in the waiting state to wait for the instruction from the main microcomputer 11 (step S31). When the instruction from the main microcomputer is made (step S32: YES), the sub-microcomputer 21 controls each part of the disc loader section 2, and executes the DVD process corresponding to the instruction (step S33). The content of the DVD process is as explained in FIG. 3 and FIG. 4.

Figure 6:
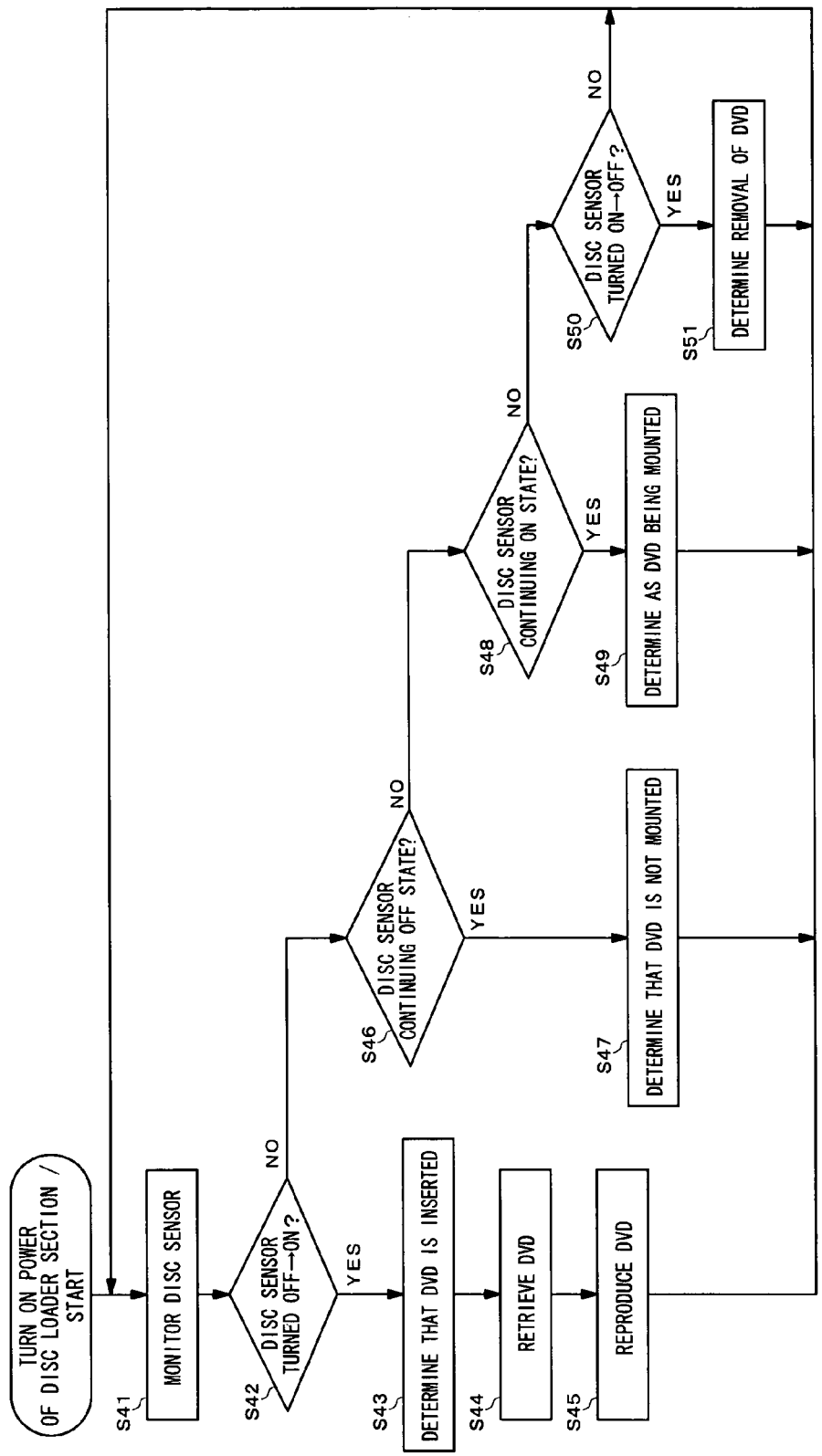
FIG. 6 is a flow chart of a sub-microcomputer of the device.

FIG. 6 is a flow chart showing the procedures of the disc detecting process performed by the sub-microcomputer 21 of the disc loader section 2 independent from each process of FIG. 5. When the power of the disc loader section 2 is turned ON, the sub-microcomputer 21 performs the state monitoring of the disc sensor 25 (step S41). When the disc sensor 25 is switched from the OFF state to the ON state (step S42: YES) during monitoring, the sub-microcomputer 21 determines that the DVD 5 has been inserted from the opening (step S43). The sub-microcomputer 21 then conveys the inserted DVD 5 inside with the disc conveying part 24 and retrieves the DVD 5 (step S44), and reproduces the data of the DVD 5 with the disc read/write part 22 and the signal processing part 23 (step S45). The picture based on the disc reproduction signal is thereby displayed on the LCD 14 and the voice is output from the speaker 15 in the television section 1.

When the disc sensor 25 continues the OFF state (step S46: YES), the sub-microcomputer 21 determines that the DVD 5 is not mounted (step S47), and continues the state monitoring of the disc sensor 25 (step S41). In this case, even if the operation keys associated with the DVD process are operated, notification that the DVD 5 is not mounted is sent from the sub-microcomputer 21 to the main microcomputer 11, and the DVD process corresponding to the key is not executed on the DVD 5. Further, when the disc sensor 25 continues the ON state after being turned ON (step S48: YES), the sub-microcomputer 21 determines that the DVD 5 is being mounted (step S49), and continues the state monitoring of the disc sensor 25 (step S41). In this case, when the operation keys associated with the DVD process are operated, the DVD process corresponding to the key is executed on the DVD 5. Further, when the disc sensor 25 is switched from the ON state to the OFF state (step S50: YES), determination is made that the DVD 5 conveyed from the inside to the opening has been removed (step S51), and the state monitoring of the disc sensor 25 is continued (step S41). The detection of removal of the DVD 5 is necessary in performing operation control of the disc conveying part 24.

Figure 7:
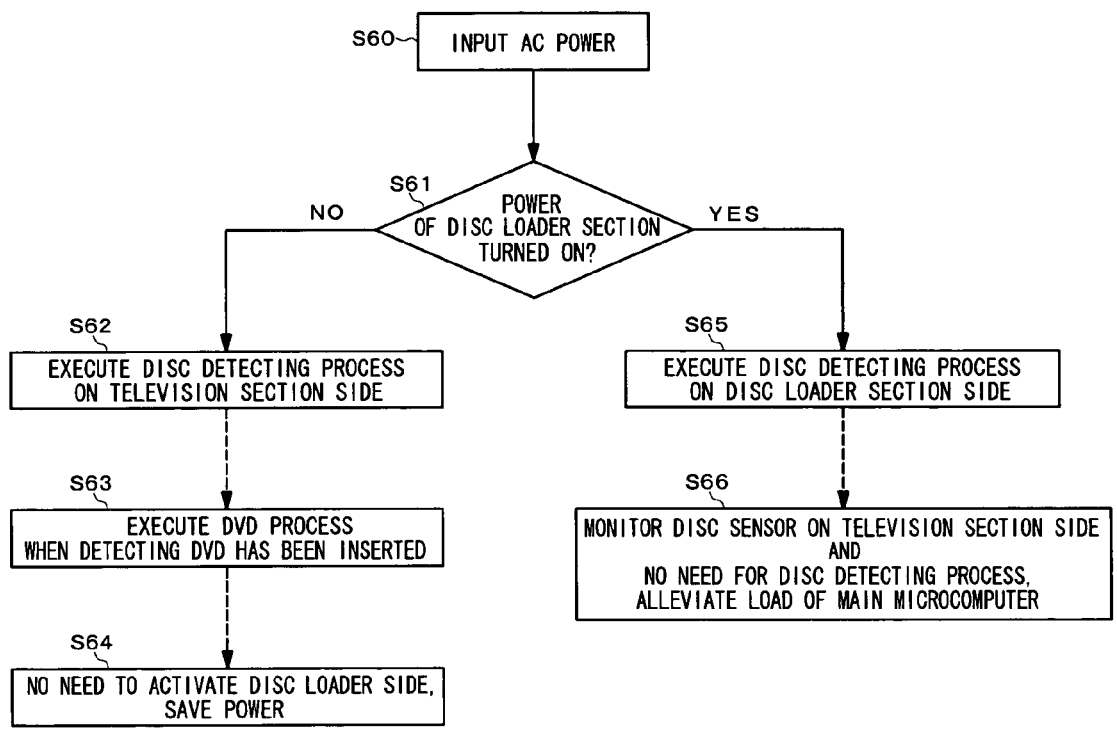
FIG. 7 is a summary flow chart of the device.

FIG. 7 shows the summary of FIG. 3 to FIG. 6 described above. That is, in a state the panel television device 100 is being supplied with the AC power (step S60), when the power of the disc loader section 2 is turned OFF (step s61: NO), the disc detecting process is executed by the main microcomputer 11 of the television section 1 (step S62), whereby the disc processes such as conveyance of the DVD 5, the reproduction of data and the like are automatically executed immediately after detecting the insertion of DVD 5 by the main microcomputer 11 (step S63), and the drive power does not need to be supplied to the sub-microcomputer 21 of the disc loader section 2, and the power can be saved (step S64). Further, when the power of the disc loader section 2 is turned ON (step S61: YES), the disc detecting process is executed in the sub-microcomputer 21 of the disc loader section 2 (step S65), so that the state of the disc sensor 25 does not need to be monitored and the disc detecting process does not need to be performed by the main microcomputer 11 of the television section 1, whereby the load of the main microcomputer 11 is alleviated (step S66). Moreover, since the existing microcomputer developed for stationary DVD player is used as the sub-microcomputer 21 of the disc loader section 2, trouble and time are not required in designing and developing of the sub-microcomputer 21, and the manufacturing cost can be reduced. Therefore, the mounted state of the DVD 5 is constantly detectable while alleviating the process of the television section 1 in the panel television device with built-in disc loader 100.

In the above described embodiment, a case is given by way of example in which the present invention is applied to the panel television device with built-in disc loader 100 in which the LCD 14 is incorporated and in which the disc loader section 2 for performing reproduction and recordation with respect to the DVD 5 is built-in, but the present invention is also applicable to the panel television device with built-in disc loader in which a thin display such as a PDP (Plasma Display Panel) is incorporated or the disc that can record pictures and the like such as a Blu-ray disc can be reproduced.

What is claimed is:

1. A panel television device with a built-in disc loader comprising:
   a disc loader section configured to convey and perform data processes with respect to a disc inserted from an opening on a side surface; and
   a television section configured to output picture and voice based on a disc reproduction signal input from the disc loader section or an externally input television signal,
   wherein the disc loader section includes:
      a disc sensor configured to change states according to detection of presence of the disc inside; and
      a sub-microcomputer configured to perform operation control of each part of the disc loader section and perform a disc detecting process for detecting a mounted state of the disc based on the state of the disc sensor,
   wherein power of the disc loader section is turned OFF other than at time of disc processing,
   wherein the television section includes a main microcomputer configured to perform operation control of each part of the television section, output operation instruction to the sub-microcomputer, and perform the disc detecting process based on the state of the disc sensor,
   wherein drive power is constantly supplied to the disc sensor and the main microcomputer even when the power of the disc loader section is turned OFF,
   wherein the disc detecting process is performed by the sub-microcomputer when the power of the disc loader section is turned ON, and the disc detecting process is performed by the main microcomputer when the power of the disc loader section is turned OFF, and
   wherein the main microcomputer performs state-monitoring of the disc sensor and detects the disc based on the state of the disc sensor when the power of the disc loader section is turned OFF.

2. A panel television device with a built-in disc loader comprising:
   a disc loader section configured to process a disc inserted from an opening on a side surface; and
   a television section configured to output picture and voice based on a disc reproduction signal input from the disc loader section or an externally input television signal,
   wherein the disc loader section includes:
      a detecting means configured to change states according to detection of presence of the disc inside; and
      a controlling means configured to perform a disc detecting process for detecting a mounted state of the disc based on the state of the detecting means,
   wherein power of the disc loader section is turned OFF other than at time of disc processing,
   wherein the television section includes a controlling means configured to perform the disc detecting process based on the state of the detecting means;
   wherein drive power is constantly supplied to the detecting means and the controlling means of the television section even when the power of the disc loader section is turned OFF,
   wherein the disc detecting process is performed by the controlling means of the disc loader section when the power of the disc loader section is turned ON, and the disc detecting process is performed by the controlling means of the television section when the power of the disc loader section is turned OFF,
   wherein the controlling means of the television section performs state-monitoring of the detecting means and detects the disc based on the state of the detecting means when the power of the disc loader section is turned OFF.

* * * * *